(12) United States Patent
Shepherd

(10) Patent No.: US 7,457,263 B2
(45) Date of Patent: Nov. 25, 2008

(54) APPARATUS AND METHOD FOR CHANNEL REQUEST IN A WIRELESS COMMUNICATION SYSTEM

(75) Inventor: Johnny D. Shepherd, Hillsborough, NC (US)

(73) Assignee: Ericsson, Inc., Research Triangle Park, NC (US)

(*) Notice: Subject to any disclaimer, the term of this patent is extended or adjusted under 35 U.S.C. 154(b) by 993 days.

(21) Appl. No.: 09/999,651

(22) Filed: Oct. 30, 2001

(65) Prior Publication Data

US 2003/0081568 A1    May 1, 2003

(51) Int. Cl.
*H04Q 7/00* (2006.01)
*H04Q 7/20* (2006.01)
*H04J 3/16* (2006.01)

(52) U.S. Cl. .................. 370/329; 370/437; 455/450

(58) Field of Classification Search ............. 370/278, 370/329, 336, 337, 347, 442, 431, 438; 455/450
See application file for complete search history.

(56) References Cited

U.S. PATENT DOCUMENTS

| | | | | |
|---|---|---|---|---|
| 5,432,780 A | * | 7/1995 | Smith et al. | 370/297 |
| 5,671,219 A | * | 9/1997 | Jensen et al. | 370/280 |
| 5,963,860 A | * | 10/1999 | Muths et al. | 455/412.1 |
| 6,147,983 A | * | 11/2000 | Backstrom | 370/330 |
| 6,148,135 A | * | 11/2000 | Suzuki | 386/12 |
| 6,205,133 B1 | * | 3/2001 | Bexten | 370/343 |
| 6,317,423 B1 | * | 11/2001 | Jantti et al. | 370/347 |
| 6,456,858 B1 | * | 9/2002 | Streter | 455/552.1 |
| 6,628,676 B1 | * | 9/2003 | Grohn et al. | 370/508 |
| 6,856,602 B1 | * | 2/2005 | Westberg | 370/254 |
| 6,963,746 B2 | * | 11/2005 | Sato et al. | 455/450 |
| 2002/0025812 A1 | * | 2/2002 | Ahlstrand et al. | 455/435 |

FOREIGN PATENT DOCUMENTS

SE    WO96/22666    *    7/1996

OTHER PUBLICATIONS

"IS-95 CDMA and CDMA2000", by Vijay K. Garg, Prentice-Hall, © 2000, p. 145.*

* cited by examiner

*Primary Examiner*—Kwang B. Yao
*Assistant Examiner*—Warner Wong
(74) *Attorney, Agent, or Firm*—Frederick D. Bailey; Moore & Van Allen, PLLC

(57) ABSTRACT

Apparatus and Method for Channel Request in a Wireless Communication System. The present invention provides a method to request channels in a wireless communication system in order to efficiently allocate channel resources by using channel function information about each transceiver. A method is provided in a wireless communication system which includes a communication link having a plurality of channels and a plurality of radio heads each having transceivers for connecting to mobile terminals. The method comprises defining a channel function for a transceiver of one of the radio heads, determining whether the transceiver requires a dedicated channel for the channel function, and, if the transceiver requires the dedicated channel for the channel function, requesting a channel for the transceiver. In another embodiment, the method further comprises determining if a channel on the communication link is available for the channel function, and, if a channel is available for the transceiver, assigning the channel to the transceiver.

31 Claims, 4 Drawing Sheets

APPARATUS AND METHOD FOR CHANNEL REQUEST IN A WIRELESS COMMUNICATION SYSTEM

BACKGROUND OF THE INVENTION

In a typical cellular system, several large cells cover a single city. A wireless system on a smaller scale is a microcellular system. A microcellular system typically covers the area of a large cell and each cell has a radius of 100-300 meters in an outdoor or indoor installation. Picocellular systems are still smaller in scale and cover a radius of up to 60 meters extending the coverage to places where micro sites are impractical.

One type of picocellular system is an indoor, wireless communication system, such as wireless office system (WOS) or a picocell extension to the public land mobile network (PLMN). The picocellular system is divided into physically distributed regions within the indoor environment providing an air interface between mobile terminals and radio heads. The radio heads are typically cascaded in a "daisy chain" fashion to a control radio interface. The control radio interface is typically connected to the PSTN by pulse code modulation (PCM) line, a communication link such as a T1 or E1 line.

In a typical indoor, wireless communication system, most telecommunication services have substantially the same channel structure, for example, each radio head has access to a plurality of channels, or timeslots, on the communication link. The radio head includes transceivers configured to handle a multitude of system functions, such as control channels, verification devices, voice channels (analog and digital), and packet data. During operation, a transceiver occupies a certain number of channels in order to handle its system functions. The introduction of more powerful and complex services requires the allocation of a variable number of channels for different radio heads. Appropriate channel allocation methods are desirable for efficiently allocating resources without blocking.

BRIEF SUMMARY OF THE INVENTION

The present invention provides a method and apparatus for requesting channels in a wireless communication system. The present invention serves to efficiently allocate channel resources by using channel function information about each transceiver. In one embodiment of the present invention, a method is provided for channel request in a wireless communication system including a communication link having a plurality of channels and a plurality of radio heads each having transceivers for connecting to mobile terminals. The method comprises defining a channel function for a transceiver of one of the radio heads, determining whether the transceiver requires a dedicated channel for the channel function, and, if the transceiver requires the dedicated channel for the channel function, requesting a channel for the transceiver.

According to another embodiment of the present invention, an apparatus is provided for requesting channels in a wireless communication system including a communication link having a plurality of channels and a plurality of radio heads each having a set of transceiver for connecting to mobile terminals. The apparatus comprises means for defining a channel function for a transceiver of one of the radio heads, means for determining whether the transceiver requires a dedicated channel for the channel function, and means for requesting a channel for the transceiver for the channel function.

According to yet another embodiment of the present invention, a programmed mobile switching center is provided, operable for requesting channels in a wireless communication system including a communication link having a plurality of channels and a plurality of radio heads each having a set of transceivers for connecting to mobile terminals. The programmed control radio interface includes program code for defining a channel function for a transceiver of one of the radio heads, for determining whether the transceiver requires a dedicated channel for the channel function, and for requesting a channel for the transceiver for the channel function.

In still yet another embodiment of the present invention, a wireless communication system enabled for requesting channels is provided. The wireless communication system includes a communication link having a plurality of channels and a plurality of radio heads each including at least one transceiver for connecting to mobile terminals. The wireless communication system further includes a mobile switching center connected to the communication link and the plurality of radio heads. The mobile switching center is operable to define a channel function for a transceiver, determine whether a transceiver requires a dedicated channel for the channel function, and request a channel for a transceiver.

These and other advantages of the present invention will become apparent to those skilled in the art upon a reading of the following specification of the invention and a study of the several figures of drawings.

DETAILED DESCRIPTION OF THE INVENTION

Figure 2:
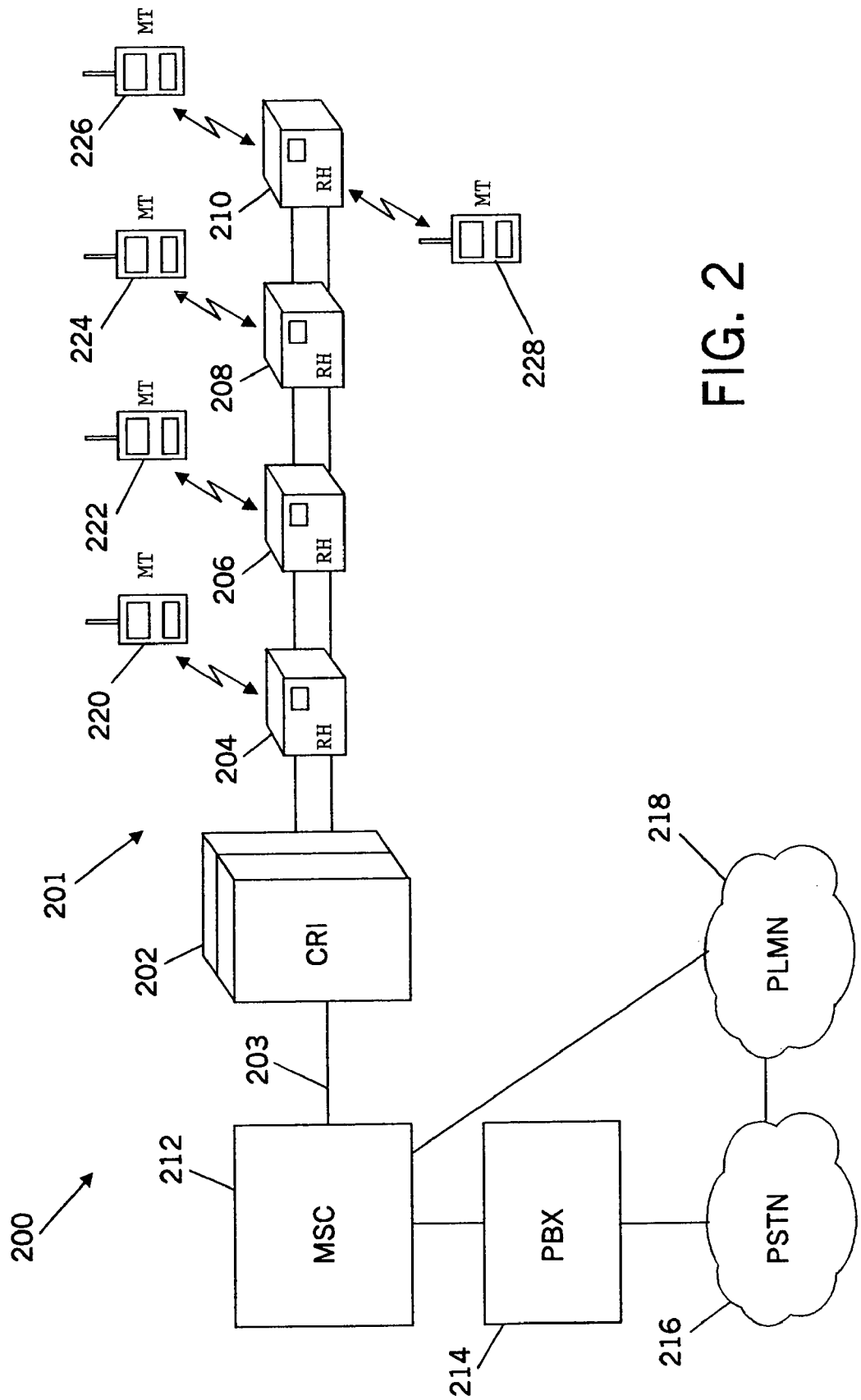
FIG. 2 is a network diagram, which illustrates the operating environment of the present invention.

Referring to FIG. 2, a generalized block diagram illustrates a communication system 200 in accordance with the invention. The communication system 200 is a multi-network communication system, here shown to include the Public Switched Telephone Network (PSTN) 216, Public Land Mobile Network (PLMN) 218, and a picocellular network, shown generally at 201. The picocellular network 201 includes a control radio interface (CRI) 202, connected to a plurality of cascaded radio heads (RH) (204, 206, 208, 210) four of which are shown. In this embodiment, the radio heads can be located up to 1000 meters from the CRI 202.

The mobile switching center (MSC) 212 controls and monitors the CRI 202 and radio heads (204, 206, 208, 210). In this embodiment, each radio head (204, 206, 208, 210) provides four radio transceivers (TRXs) that are generally configured to operate on one Digital Control Channel (DCCH), one Mobile Location Verification Module (VER), and eight Digital Voice Channels (DVCs). In this example, the antennas are located within the radio head. Alternatively, external antennas may be used with the system.

The following are various types of cell configurations that may be implemented: digital only, analog gateway, dual-mode, and analog-only. In this embodiment, the digital only cell offers support for mobile terminals with digital control and voice channels and supports hand-offs of these mobile terminals operating in digital mode from other cells operating in the 850 MHz cellular band. Digital-only cells require DCCH, DVC, and VER functions. The analog gateway cell in this embodiment provides hand-offs of IS-136 compatible mobile terminals that operate in the 850 MHz band from neighbor cells that support only AVC. IS-136 is also known as TIA/EIA-136, the so-called "North American" TDMA standard specified in document TIA/EIA-136, Revision B, published Mar. 1, 2000, by the Telecommunications Industry Association (TIA). An AVC and a Signal Strength Receiver (SR) are required for location and verification functions to support hand-offs. Analog gateway cells use DCCH, DVC, and VER functions internally. The dual-mode cell in this embodiment provides both analog and digital voice channel capability internally, with control provided through an Analog Control Channel (ACC). Dual-mode cells require ACC, AVC, DVC, VER, and SR functions. Alternatively, a DCCH may be included. The analog-only cell provides analog voice and control channel capabilities. Analog-only cells require ACC, AVC, and SR functions.

CRI 202 is connected to a MSC 212 by a communication link 203, which is in turn connected to a private branch exchange (PBX) 214. The communication link 203 is a T1 line, but may alternatively be any other known communication link having allocable channels. An allocable channel is any channel that can be switched for use by one terminal to another terminal.

The interwork between the PBX 214 and the mobile switching center 212 can take place using any type of extension interface. The extension interface may, for example, provide concentrated access e.g. via the ISDN interface or may provide multiplexed access over the PCM (Pulse Code Modulation)/CAS (Channel Associated Signaling) interface, but it may also be an analog line. PCM is the transmission technique in this embodiment.

There are two types of channels utilized, namely, a control channel and a working channel. On the control channel, system information is transmitted back and forth between the mobile terminals and the radio head, and includes information such as channel availability, channel assignment, radio ID/LID (Logical ID)/GID (Group ID) and other control-type data for system bookkeeping purposes. On the working channel, data and/or voice communication signals, with certain overhead information, are transmitted. As used herein, the term "channel" refers to a communication connection, or pathway for communication. A "channel" may consist of a frequency, a frequency and time slot (such as in a TDMA system), any combination of frequencies and timeslots, or a spreading code (such as in a CDMA system).

Control channels are used for setting up calls, informing the radio heads (204, 206, 208, 210) about location and parameters associated with mobile terminals, and informing the mobile terminals about location and parameters associated with the radio heads ad cellular system configuration. The radio heads listen for call access requests by mobile terminals and the radio heads in turn listen for paging messages. Once a call access message has been received, it must be determined which cell should be responsible for the call. Next, the assigned cell is ordered, by the mobile switching center (MSC) for example, to tune to an available voice channel which is allocated from the set of voice channels accessible to the assigned cell.

The PBX 214 receives messages from, and sends messages to, the PSTN 216. The MSC 212 may also be connected to the public land mobile network (PLMN) 218. The MSC 212 is provisioned with information about the various mobile terminals (220, 222, 224, 226, 228) served so that exchange can appropriately handle system functions requiring channel allocation. Thus, the CRI 202 controls and coordinates the wireless connections among the plurality of radio heads (204, 206, 208, 210) and various wireless communication devices, represented by mobile terminals (MT) (220, 222, 224, 226, 228) and the PSTN 216 or PLMN 218. Each radio head (204, 206, 208, 210) includes a plurality of transceivers, each of which may be allocated and configured with a channel to handle one of a plurality of system functions.

Figure 4:
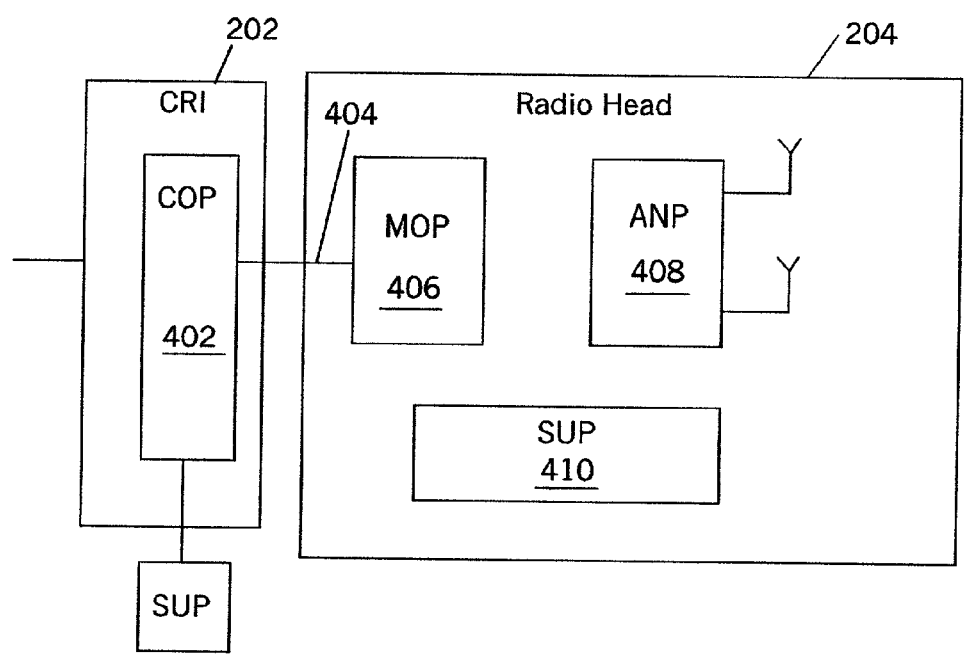
FIG. 4 is a block diagram of a control radio interface and radio head.

Referring to FIG. 4, a block diagram of a CRI 202 and radio head 204 is illustrated in more detail in accordance with the invention. The CRI, in accordance with one embodiment of the invention, includes control part (COP) 402 having a programmed processing system. The processing system is conventional in nature and circuitry for managing the functions of the CRI 202 as is well known and is therefore not specifically shown herein. In one embodiment, the processing system includes a central processing unit, such as a microprocessor or digital signal processor, and associated memory. The CRI 202 includes a channel allocation function in the processing system which uses algorithms for making channel allocation decisions based on whether a system function requires a dedicated channel. Additionally, the operator may program the processing system to define the function of a transceiver. The CRI 202 has functions which include: interface to the MSC 212 via the communication link 203; interface to the radio head 204 via PCM cable 404; network and air frame synchronization (AFS) timing; carrier frequency stabilization; air interface logical control channel functions; channel time switching to set up semi-permanent time-switched connections of coded speech data and control data to the transceivers; regional processing for the distributed operating system; and processing capability to perform mobile telephony channel functions.

The modem part (MOP) 406 provides conversion from speech and mobile station control channel data to and from radio waves to communicate with mobile terminals. The voice transcoder part of the MOP functionality resides in the MSC 212 (shown in FIG. 2). The antenna near part (ANP) 408 in this embodiment includes combining and separating radio frequency carriers for transmitting and receiving on the same radio antennas. The support part (SUP) 410 provides DC power to the hardware units hosting the functional modules. The SUP 410 also provides cooling where needed.

Figure 5:
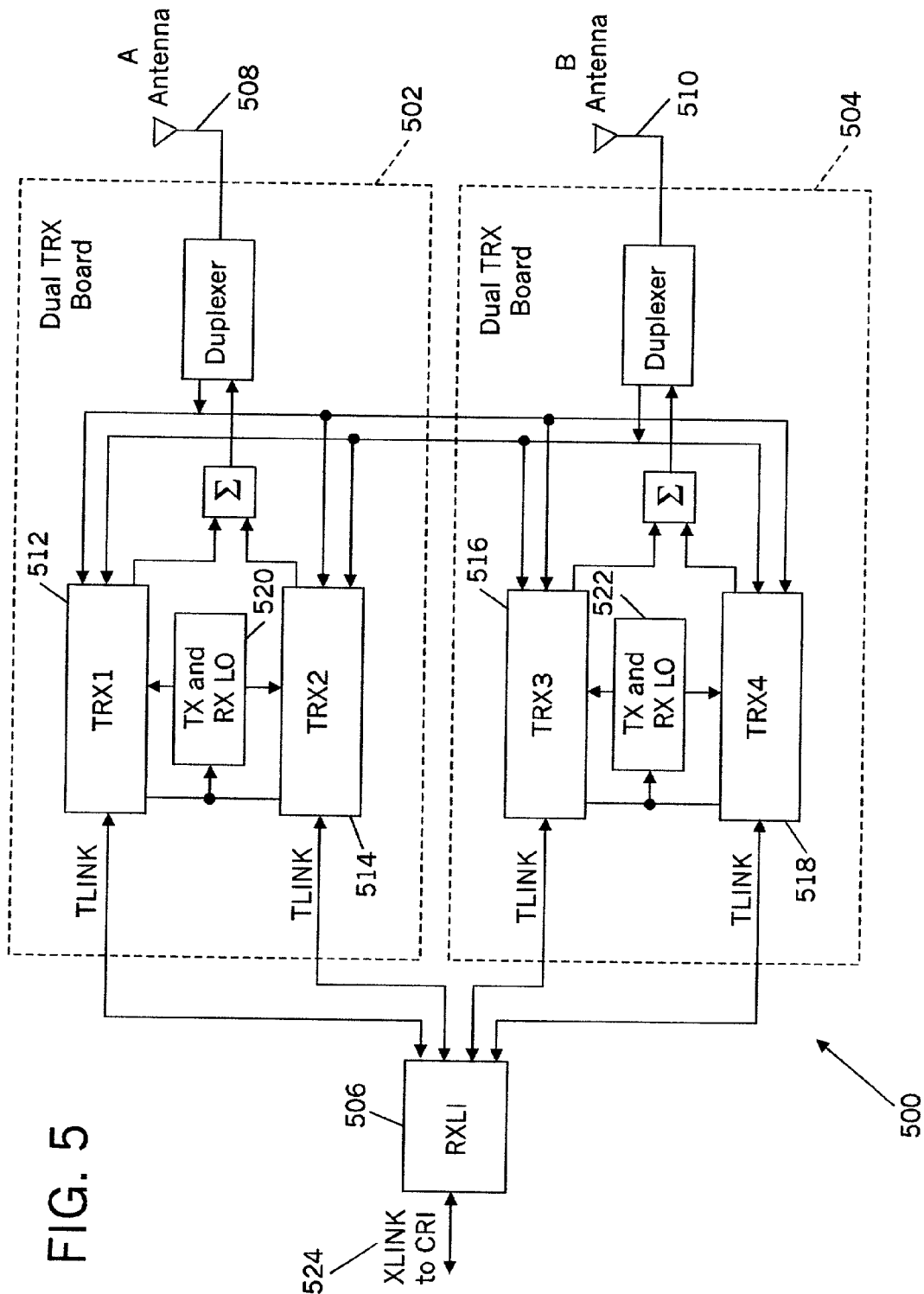
FIG. 5 illustrates a radio head in accordance with the invention.

Referring now to FIG. 5, a radio head 500 in accordance with the invention is illustrated in detail. The radio head 500 implements the MOP functionality and part of the ANP and SUP functionality. RF shielding is typically used to minimize coupling of signals into and from the RF circuitry and allows compliance to electromagnetic interference (EMI) and electromagnetic compatibility (EMC) specifications. The radio head 500 includes two dual radio transceiver boards (TRX) (502, 504), and a remote PCM Interface 506, which is a PCM (T1) link. Each transceiver board (502, 504) contains the functionality of two transceivers (512, 514, 516, 518). In the transmit and receive sides, each transceiver (502, 504) performs frequency upconversion and downconversion in two stages with both transceivers using the same transmit and receive intermediate frequency (IF). Both transceivers on a board share a local oscillator (LO) (520, 522), which is used to upconvert and downconvert to and from the IF. In the downlink direction, coded voice data and logical channel data are combined in the transceiver. The radio head 500 contains two integrated transmit and receive monopole antennas (508, 510). The antennas (508, 510) provide an omnidirectional pattern. Alternatively, a patch antenna may be used, which provides directional pattern with gain.

The PCM cable 524 provides a PCM interface between the CRI 202 and radio head 500. Each transceiver in the radio head requires one voice and one control timeslot on the PCM cable 524. In the digital mode, the voice timeslot is subdivided into three channels that transport coded speech data from the MSC to the transceiver. An additional timeslot on the PCM cable 524 may be reserved for air frame synchronization (AFS). In this embodiment, the cabling between the CRI and the radio heads is 24 gauge twisted pair.

Figure 3:
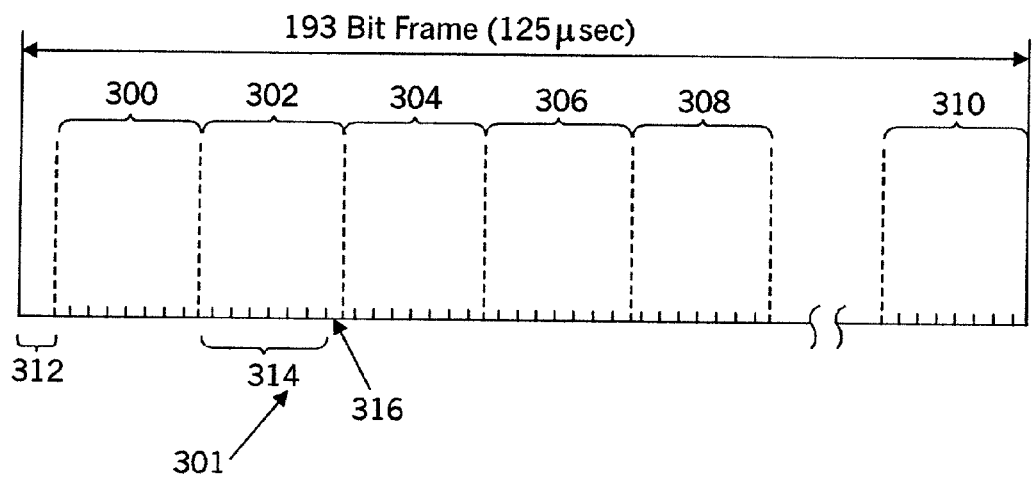
FIG. 3 is a generalized diagram illustrating a communication link having a plurality of channels for allocation in accordance with the invention.

Referring now to FIGS. 2 and 3, a generalized diagram illustrates a frame 301 of FIG. 3 sent over a communication link 203 of FIG. 2 having a plurality of channels for allocation in accordance with the invention. The communication link 203 of FIG. 2 is a T1 line with the capability to support 1.544 Mbits per second of data. One frame of a T1 line consists of 24 individual channels and one bit for frame coding 312. Only six channels are shown in FIG. 3. The frame-coding bit 312 is followed by the first channel 300, the second channel 302, the third channel 304, the fourth channel 306, the fifth channel 308, and lastly the twenty-fourth channel 310. Each channel supports 64 Kbits per second. A channel can be configured and allocated by the CRI 202 to a channel function for use by a transceiver. Each channel is comprised of 8 bits. In each channel, one bit is allocated for physical layer signaling (shown in FIG. 3 in the second channel 302 at the eighth bit 316). The other 7 bits of the channel 314 are data bits (shown in the second channel at the first to seventh bits 314).

Furthermore, the communication link 203 of FIG. 2 may be divided into channels in several other different ways. Some of the known methods are TDM (Time Division Multiplexing), FDM (Frequency Division Multiplexing), and CDM (Code Division Multiplexing). In FDM systems, the channel is defined by the used frequency. In CDM systems, the channel is defined by the used frequency hopping pattern or hash code. Combinations of the division methods mentioned above can also be used.

The present invention may be embodied in one or more systems, methods, apparatus and/or computer program products. Accordingly, the present invention may be embodied in hardware and /or software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system which is part of the communication system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Figure 1:
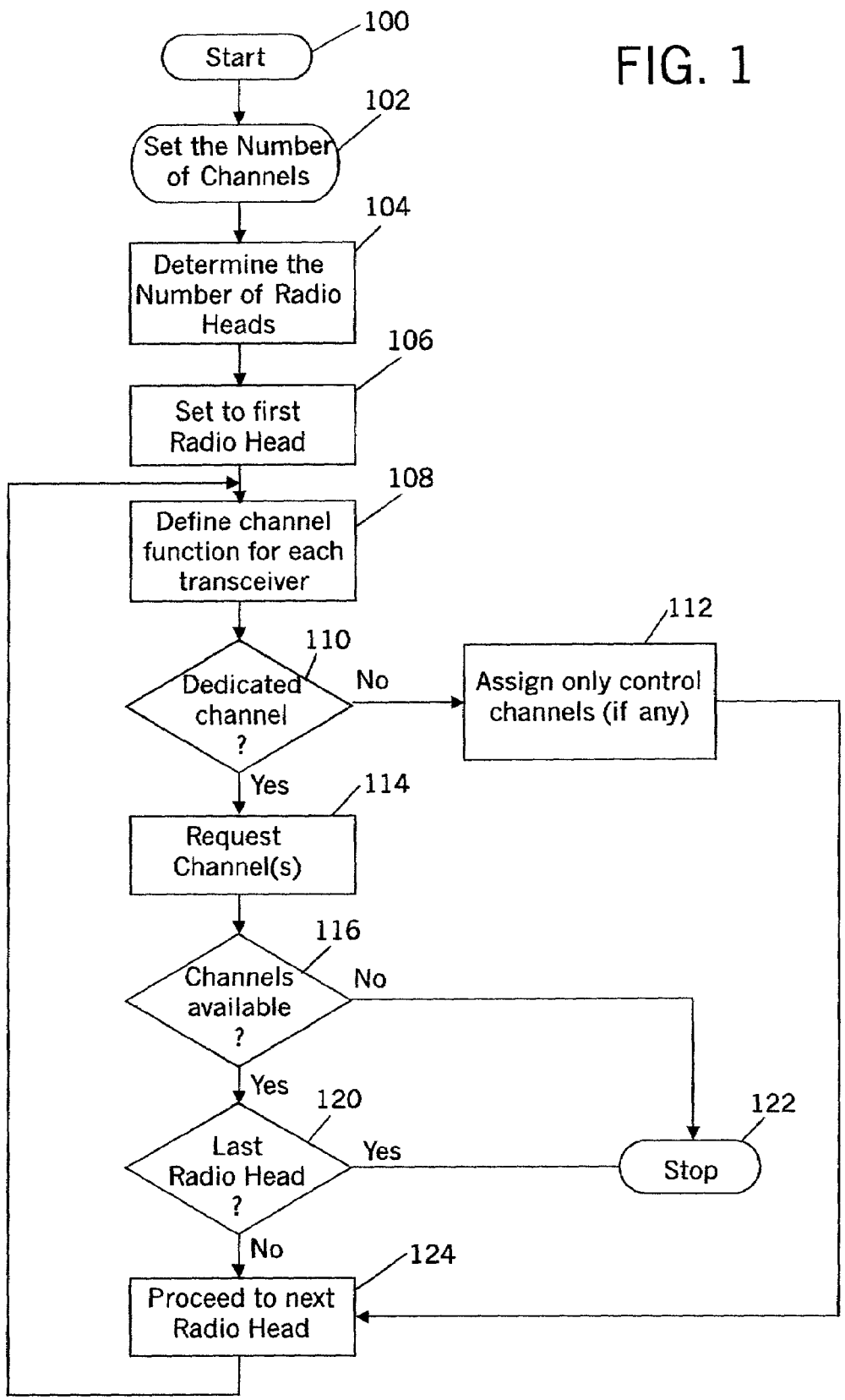
FIG. 1 is a flow chart, which illustrates an exemplary algorithm for allocating channel resources according to the principles of the present invention.

FIG. 1 illustrates an exemplary algorithm for requesting channel resources according to the principles of the present invention. In one embodiment, the process of FIG. 1 is implemented in a suitable processing circuitry such as a programmed processor located in a MSC of an indoor, wireless communication system in this embodiment. The MSC 212 controls the process of channel request. Channel request is made to the CRI 202 of FIG. 2. The process begins at start step 100. At step 102, the number of channels is set for the type of CRI-RH communication and the number of channels available for allocation. For example, a communication link that has 24 channels available with 5 channels allocated for control has 19 timeslots available for allocation to the radio heads. Next at step 104, the number of radio heads on the communication link is determined. As described above, the radio heads are connected in a cascade.

In the present algorithm, the channels are allocated to the radio heads in the sequence that the radio heads are cascaded together (e.g. in FIG. 2, radio head 204 first, radio head 206 second, radio 208 third, and lastly radio head 210). Alternatively, the channels may be allocated to the radio heads in any sequence in which the radio heads are arranged. At step 106, a first radio head is designated for processing. Once the first radio head is processed, the other radio heads are processed sequentially.

Next at step 108, the type of channel function for any transceiver on the radio head is defined. In this example, an operator defines channel function in the MSC 212. For example, the channel function for the transceiver may be as a Digital Control Channel (DCCH), Analog Control Channel (ACC). Digital Voice Channel (DVC), and Analog Voice Channel (AVC). Other such channel functions may be used.

Next, it is determined whether any transceiver requires a dedicated channel 110, such as for voice traffic. ACC, VER, and SR are some of the channel functions that do not require a PCM channel. The types of channel functions that may require a dedicated channel are voice and video traffic. If it is determined that no transceivers on the radio head require dedicated channels, then only available control channels are assigned 112. Next at step 124, the next radio head in the sequence is turned to for processing 124.

If any transceiver requires a dedicated channel, then the steps of assigning a dedicated channel begins at step 114. The MSC 212 transmits a message instructing the CRI 202 to configure its time switch in steps 114 and 116. At step 114, the MSC 212 transmits a channel request for the number of channels required by the transceiver. After requesting channels at step 114, it is determined whether any channels are available on the communication link 116. The CRI 202 does this by checking to see if any channels are available. The MSC 212 keeps a record in its database of the channels in use and the channels available. If there are no channels available, then the process stops at step 122. If channels are available, the channels that are available are assigned. Furthermore, it is determined whether this radio head currently being processed is the last radio head in the sequence 120. If this is the last radio head in the sequence, then the process stops at step 122. If there are more radio heads in the sequence, then the process proceeds to the next radio head in the sequence at step 124. After step 124, the entire process returns to step 108. This radio head is processed as described above.

Although the above embodiment of the invention has been described as an indoor, wireless communication system, it may be embodied as any type of communication system. As used herein, the term "communication system" may include macrocellular communication systems, any type of microcellular communication system, and any other type of picocellular communication system.

As used herein, the term "mobile terminal" may include a cellular radiotelephone with or without a multi-line display; a Personal Communications System (PCS) terminal that may combine a cellular radiotelephone with data processing, facsimile, and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

I have described herein specific embodiments of an invention. One of ordinary skill in the networking and computing arts will quickly recognize that the invention has other applications in other environments. In fact, many environments and implementations are possible. In addition, the recitation "means for" is intended to evoke a means-plus-function reading of an element in a claim, whereas, any elements that do not specifically use the recitation "means for," are not intended to be read as means-plus-function elements, even if they otherwise include the word "means." The following claims are in no way intended to limit the scope of the invention to the specific embodiments described.

I claim:

1. A method for channel request in a pico cellular wireless communication system in which a network infrastructure includes a communication link having a plurality of channels and a plurality of radio heads each having transceivers for connecting to mobile terminals in the pico cellular system, the method comprising:
    in the network infrastructure:
    defining a channel function for a transceiver of one of the radio heads in the pico cellular wireless communication system, for digital-only cells the transceiver configured to support a digital control channel (DCCH) function, a digital voice channel (DVC) function, and a location verification module (VER) function, for analog gateway cells the transceiver configured to support a DCCH function, a DVC function, and a VER function, for dual mode cells the transceiver configured to support an analog control channel (ACC) function, a DVC function, and a VER function, and for analog-only cells the transceiver configured to support a ACC function, an analog voice channel (AVC) function, and a signal strength receiver (SR) function;
    determining whether the transceiver requires a dedicated channel or a control channel for the defined channel function; and
    requesting an entire channel for the transceiver when the transceiver requires the dedicated channel for the defined channel function.

2. The method of claim 1 further comprising allocating an entire channel to the transceiver.

3. The method of claim 1 wherein requesting a dedicated channel for the transceiver further comprises:
    determining if a channel on the communication link is available for the channel function; and
    if a channel is available for the transceiver, assigning the channel to the transceiver.

4. The method of claim 1 wherein the communication link is a PCM connection, and the communication channel consists of at least a portion of a timeslot of the PCM connection.

5. The method of claim 1 further comprising:
    if the transceiver does not require the dedicated channel for the channel function, assigning necessary control channels to the transceiver.

6. The method of claim 1 further comprising designating a first radio head for processing.

7. The method of claim 1 wherein the transceiver channel functions are one of the set of digital control channel, analog control channel, digital voice channel, digital traffic channel, and analog voice channel.

8. The method of claim 1 wherein the function of a transceiver channel requiring a dedicated channel is for carrying voice traffic.

9. The method of claim 1 wherein the function of a transceiver channel requiring a dedicated channel is for carrying video traffic.

10. The method of claim 1 wherein the plurality of radio heads are cascaded together in a sequence and further comprising proceeding to the next radio head in the sequence.

11. The method of claim 10 wherein proceeding to the next radio head in the sequence further comprises:
    determining if there is another radio head in the sequence; and
    proceeding to the next radio head in the sequence when there is another radio head in the sequence.

12. Apparatus for requesting channels in a pico cellular wireless communication system in which a network infrastructure includes a communication link having a plurality of channels and a plurality of radio heads each having a set of transceivers for connecting to mobile terminals in the pico cellular system, comprising:
    in the network infrastructure:
    means for defining a channel function for a transceiver of one of the radio heads in the pico cellular wireless communication system, for digital-only cells the transceiver configured to support a digital control channel (DCCH) function, a digital voice channel (DVC) function, and a location verification module (VER) function, for analog gateway cells the transceiver configured to support a DCCH function, a DVC function, and a VER function, for dual mode cells the transceiver configured to support an analog control channel (ACC) function, a DVC function, and a VER function, and for analog-only cells the transceiver configured to support a ACC function, an analog voice channel (AVC) function, and a signal strength receiver (SR) function;
    means for determining whether the transceiver requires a dedicated channel or a control channel for the defined channel function; and
    means for requesting a dedicated or control channel for the transceiver based on the defined channel function.

13. The apparatus of claim 12 further comprising a means for allocating the requested channel to the transceiver.

14. The apparatus of claim 12 further comprising:
    means for determining if a channel on the communication link is available for the channel function; and
    means for assigning the requested channel to the transceiver.

15. The apparatus of claim 12 wherein the communication link is a PCM connection, and the communication channel consists of at least a portion of a timeslot of the PCM connection.

16. The apparatus of claim 12 further comprising means for assigning available control channels.

17. The apparatus of claim 12 further comprising means for designating a first radio head for processing.

18. The apparatus of claim 12 wherein the transceiver channel functions are digital control channel, analog control channel, digital traffic channel, and analog voice channel.

19. The apparatus of claim 12 wherein the function of a transceiver channel requiring a dedicated channel is for carrying voice traffic.

20. The apparatus of claim 12 wherein the function of a transceiver channel requiring a dedicated channel is for carrying video traffic.

21. The apparatus of claim 12 wherein the plurality of radio heads are cascaded together in a sequence and further comprising:
  means for proceeding to the next radio head in the sequence.

22. The apparatus of claim 21 wherein proceeding to the next radio head in the sequence further comprises:
  means for determining if there is another radio head in the sequence; and
  means for proceeding to the next radio head in the sequence.

23. A programmed mobile switching center operable for requesting channels in a pico cellular wireless communication system in which a network infrastructure includes a communication link having a plurality of channels and a plurality of radio heads each having a set of transceivers for connecting to mobile terminals in the pico cellular system, comprising:
  in the network infrastructure:
  module for defining a channel function for a transceiver of one of the radio heads in the pico cellular wireless communication system, digital-only cells the transceiver configured to support a digital control channel (DCCH) function, a digital voice channel (DVC) function, and a location verification module (VER) function, for analog gateway cells the transceiver configured to support a DCCH function, a DVC function, and a VER function, for dual mode cells the transceiver configured to support an analog control channel (ACC) function, a DVC function, and a VER function, and for analog-only cells the transceiver configured to support a ACC function, an analog voice channel (AVC) function, and a signal strength receiver (SR) function;
  module for determining whether the transceiver requires a dedicated channel or a control channel for the defined channel function; and
  module for requesting a dedicated channel or a control channel for the transceiver based on the defined channel function.

24. The programmed mobile switching center of claim 23 further comprising:
  module for determining if a channel on the communication link is available for the channel function; and
  module for assigning the requested channel to the transceiver.

25. The programmed mobile switching center of claim 23 further comprising:
  module for assigning available control channels.

26. The programmed mobile switching center of claim 23 wherein the plurality of radio heads are cascaded together in a sequence and further comprising:
  module for proceeding to the next radio head in the sequence.

27. The programmed mobile switching center of claim 26 wherein the proceeding to the next radio head in the sequence is accomplished by:
  determining if there is another radio head in the sequence; and
  proceeding to the next radio head in the sequence when there is another radio head in the sequence.

28. A pico cellular wireless communication system network infrastructure enabled for requesting channels comprising:
  a communication link including a plurality of channels;
  a plurality of radio heads each including at least one transceiver for connecting to mobile terminals; and
  a mobile switching center connected to the communication link and the plurality of radio heads, the mobile switching center operable to define a channel function for a transceiver, determine whether a transceiver requires a dedicated channel or a control channel for the channel function, and request a dedicated channel or a control channel for a transceiver, for digital-only cells the transceiver configured to support a digital control channel (DCCH) function, a digital voice channel (DVC) function, and a location verification module (VER) function, for analog gateway cells the transceiver configured to support a DCCH function, a DVC function, and a VER function, for dual mode cells the transceiver configured to support an analog control channel (ACC) function, a DVC function, and a VER function, and for analog-only cells the transceiver configured to support a ACC function, an analog voice channel (AVC) function, and a signal strength receiver (SR) function.

29. The pico cellular wireless communication system of claim 28 wherein the communication link is a PCM connection, and the communication channel consists of at least a portion of a timeslot of the PCM connection.

30. The pico cellular wireless communication system of claim 28 wherein the function of a transceiver channel requiring a dedicated channel is for carrying voice traffic.

31. The pico cellular wireless communication system of claim 28 wherein the function of a transceiver channel requiring a dedicated channel is for carrying video traffic.

* * * * *